United States Patent [19]

Gibson et al.

[11] 4,024,320

[45] May 17, 1977

[54] GALVANIC CELLS

[75] Inventors: John George Gibson, Whatstandwell; James Lowe Sudworth, Burton-on-Trent, both of England

[73] Assignee: Chloride Silent Power Ltd., London, England

[22] Filed: Dec. 15, 1975

[21] Appl. No.: 641,111

[30] Foreign Application Priority Data

Jan. 10, 1975 United Kingdom ............... 1149/75

[52] U.S. Cl. ............................... 429/104; 429/218
[51] Int. Cl.² ......................................... H01M 6/18
[58] Field of Search .......... 136/6 FS, 6 F, 20, 83 R, 136/100 R; 429/104, 101, 102, 191, 164, 218

[56] References Cited

UNITED STATES PATENTS

| | | | |
|---|---|---|---|
| 3,749,603 | 7/1973 | Stringham et al. | 429/104 |
| 3,765,944 | 10/1973 | Taplin et al. | 429/102 |
| 3,883,367 | 5/1975 | Chiku et a. | 136/6 F |
| 3,932,195 | 1/1976 | Evans et al. | 136/6 FS |
| 3,939,007 | 2/1976 | Sudworth et al. | 136/6 FS |

Primary Examiner—Anthony Skapars
Attorney, Agent, or Firm—Fred Philpitt

[57] ABSTRACT

A current collecting pole associated with an alkali metal-sulphur cell comprises a first layer of an electronically conducting material which is resistant to the corrosive action of sulphur and alkali metal polysulphides (e.g. carbon or graphite) and which defines a continuous surface in contact with the sulphur and alkali metal polysulphides and a second layer of a higher electronically conducting material which is in electrical contact with the first layer over the surface of the latter remote from the sulphur and alkali metal polysulphides.

24 Claims, 2 Drawing Figures

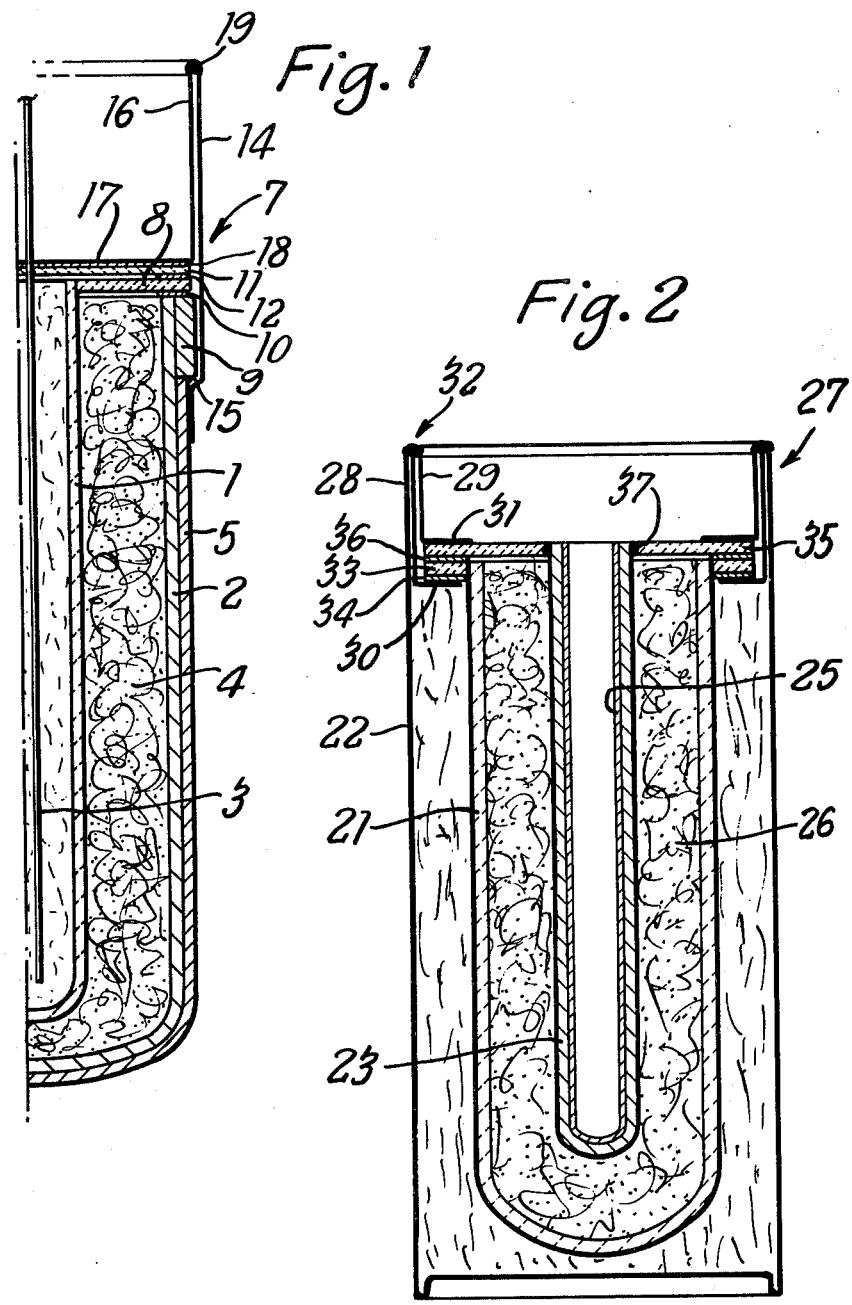

GALVANIC CELLS

BACKGROUND OF THE INVENTION

This invention relates to galvanic cells in which the electrochemical reactants are an alkali-metal e.g. sodium, as the anode and sulphur as the cathode, anode and cathode compartments being separated by a solid electrolyte which is an alkali-metal ion conductor (in the case of sodium-sulphur cells this may be a polycrystalline ceramic conventionally known as Beta-alumina) and in which respective current collecting poles are associated with the anode and cathode compartments. The cell is operated at a temperature of about 350° C so that the electrochemical reactants are in the molten state. During discharge of the cell polysulphides of the alkali metal are formed in the cathode compartment.

The physical shape of the cell may be of tubular of flat-plate form. When of tubular form, the cell comprises outer and inner tubes spaced from each other. The outer tube may be of electronically conducting material so that it constitutes one current collecting pole of the cell, the inner tube comprising the solid electrolyte. Thus the space between the two tubes defines either the anode or cathode compartment as desired and the space within the electrolyte tube then constitutes the cathode or anode compartment. A current collecting pole extends into the electrolyte tube. When the cell is of flat-plate form, electronically conducting plates close the ends of a shallow cell housing and constitute the current collecting poles and an electrolyte plate extends across the housing to divide it into anode and cathode compartments. A series of flat-plate cells can be stacked end to end to form a layer-type battery and in this case a single electronically conducting plate can be used between each pair of adjacent cells to act as a bi-pole; such an arrangement is described in British Pat. No 1,344,069.

For efficient cell operation the current collecting poles must have a low electrical resistance. However the severe corrosion conditions associated with the sulphur and polysulphides in the cathode compartment at the cell operating temperature preclude the use of conventional low resistance metals for the current collecting pole in contact with these materials. Carbon or graphite offers itself as a material for use as a possible current collecting pole for this corrosive environment but suffers from the disadvantage that it has a relatively high resistance which would result in ohmic losses in the pole causing lowering of the efficiency of the cell and a reduction of the available power. It would also result in a distribution of potential along the pole and hence a heterogeneous distribution of reaction rate throughout the cathode compartment during both the charge and discharge modes and this could have a serious adverse effect on the cyclic behaviour of the cell. Another proposal is to use an electronically conducting ceramic but this suffers from the same disadvantages as carbon and graphite.

SUMMARY OF THE INVENTION

One object of the invention is to provide a substantially non-corrosive current collecting pole for use in the cathode compartment of the cell and which does not suffer from the disadvantage of relatively high ohmic resistance.

According to the present invention the current collecting pole associated with the cathode compartment comprises a first layer of electronically conducting material, which is resistant to the corrosive action of sulphur and alkali metal polysulphides and which defines a continuous surface in contact with the sulphur and alkali metal polysulphides in the cathode compartment and a second layer of a higher electronically conducting material, for example low resistance metal such as copper, silver, gold, nickel or brass in electrical contact with said first layer over the surface of said first layer remote from the sulphur and sodium polysulphides. Thus the low resistance metal for example presents a virtually equi-potential surface along the full length of the pole and the only ohmic contribution of the corrosion-resistant material is that arising from the thickness of said first layer.

When used in a tube cell in which the interior of the electrolyte tube consitutes the cathode compartment, the current collecting pole in accordance with the invention may be in the form of a tube of said corrosion resistant material projecting down into the electrolyte tube and closed at its end within the electrolyte tube, a layer of low resistance metal being provided on the inside of the tube. Alternatively the inside of the tubular current collecting pole may be filled with a metal wool of a low resistance metal.

When used in a tube cell in which the space between the inner and outer tubes constitutes the cathode compartment, the outer tube is made of said corrosion resistant material and is provided on its outer surface with a layer of said low resistance material. The outer tube could then, if necessary, be sheathed in a metal tube for mechanical protection and strength.

When used in a single flat plate cell or the terminal cell of a layer-type battery the outer surface of a plate-form current collecting pole of said corrosion resistant material is covered with a layer of said low resistance metal. In the case of the intermediate cells of a layer type battery in which the intermediate plate-form poles of said corrosion resistant material are serving as bipoles, the layer of low resistance metal would be on the surface of the pole in the anode (i.e. sodium) compartment of the adjacent cell. The low resistance metal used would be selected so that if formed a barrier layer between the sodium and said corrosion resistant material, particularly when this is of carbon or graphite; copper and aluminium would be suitable metals.

The layer of low resistance metal may be provided by standard plating methods.

When said corrosion resistant material comprises carbon or graphite, its open porosity may be detrimental since the sulphur and polysulphide material may permeate through it and come into contact with said higher electronically conducting material and corrode it to an extent that it no longer performs its function satisfactorily. In further development of the invention therefore, methods have been devised for dealing with this problem.

In one such method the pores of the carbon or graphite layer in the region of its interface with said higher electronically conducting material are filled with a metal sulphide. The metal sulphide may be formed in-situ by providing a layer of a suitable metal on the surface of the carbon or graphite layer remote from the sulphur and polysulphides in the cathode compartment, so that when the sulphur and polysulphides permeate through the carbon or graphite layer they corrode the metal layer to form the metal sulphide until the pores in the carbon or graphite become filled to an extent that further reaction becomes inhibited.

Said metal layer may comprise said higher electronically conducting material providing it is initially thick enough to form the pore-filling metal sulphides and still leave an adequate layer or coating for high electronic conduction. Many of the metals which are conventionally plated from aqueous solutions, e.g. Cu, Ni, Cr, Au, Ag are suitable for this dual purpose. Similarly metal alloys used for electroplating such as NiSn may be used.

Alternatively said metal layer or coating may be provided as an intermediate, corrodible barrier layer or coating between the carbon or graphite and said higher electronic conducting material. Metals which are known to form highly insoluble sulphides, e.g. Mo and W, may be deposited as barrier layers by conventional vapour decomposition techniques e.g. from the volatile fluorides, the barrier layer being subsequently plated with a metal e.g. Cu constituting said layer of high electronically conducting material.

In a second such method a metal carbide barrier layer is provided. This can be formed in situ by coating the carbon or graphite with a metal layer of for example iron or chromium and then heating so that the metal layer reacts with the carbon or graphite to form the carbide layer. Such a carbide layer is much more resistant to corrosion by sulphur and sodium polysulphides than the highly conducting metal layer and will not significantly affect the electronic conductivity of the current collecting pole.

Two sodium-sulphur tube cell constructions in accordance with the invention will now be described by way of example with reference to the accompanying diagrammatic drawings.

DESCRIPTION OF DRAWINGS

FIG. 1 shows a half longitudinal section of the first tube cell construction,

FIG. 2 shows a longitudinal section of the second tube cell construction.

DETAILED DESCRIPTION

Referring to FIG. 1, the cell construction comprises co-axial inner and outer tubes 1 and 2. The inner tube 1 constitutes the solid electrolyte of the cell and is made of Beta-alumina. The interior of the tube 1 constitutes the anode compartment of the cell. A metal current collector 3 extends almost to the bottom of the tube 1.

The space 4 between the two tubes 1 and 2 constitutes the cathode compartment of the cell and therefore contains the sulphur material. The tube 2 serves as the current collector in the cathode compartment and is made of carbon or graphite. To improve current collection the outer surface of the tube 2 has a layer 5 of low resistance metal plated on to the tube 2.

A compression seal assembly 7 is provided for closing the open ends of the tubes 1 and 2. To form the compression seal assembly 7, the inner tube 1 is provided with an alpha-alumina flange 8 which abuts a brazed-on metal flange 9 on the outer tube 2 through an aluminium or "Grafoil" gasket 10 to close the open end of the outer tube 2. The end of the inner tube 1 is closed by closure member 11 which abuts the flange 8 through aluminium sealing gasket 12. The assembly is held in compression by a clamping member which has an outer sleeve 14 of stainless steel fittng over the outside of the tube 2 and stepped inwardly to provide an internal should 15 engaging under flange 9 and an inner sleeve 16 of stainless steel closed at one end by integral end plate 17 which serves to clamp the seal assembly 7 together by pressing against closure member 11 through an insulating gasket 18. In forming the compression seal assembly 7 the outer sleeve 14 is secured in position first so that it becomes embedded at one end in coating 5. After preloading of the assembly the sleeve 16 is welded to the sleeve 14 at 19.

Referring to FIG. 2, the cell comprises inner and outer co-axial tubes 21 and 22, the tube 21 being formed of beta-alumina and constituting the electrolyte of the cell and serving to define the anode and cathode compartments. However in this construction the interior of the tube 21 constitutes the cathode compartment of the cell and therefore contains the sulphur material and the space between tubes 21 and 22 constitutes the anode compartment. The current collecting pole for the anode compartment is the tube 22 which is made of steel. The current collector in the cathode compartment comprises a further tube 23 of carbon or graphite rendered impermeable to molten sulphur and sodium polysulphides by any of the methods described above and extending co-axially within tube 21. The inner surface of the tube 23 has a coating 25 of low resistance metal as described above. A felt 26 of electrically conducting material, e.g. graphite, is disposed in the cathode compartment to facilitate the electron flow from the electrolyte tube 21 to the current collector 23.

A compression seal assembly 27 is provided to close the ends of tubes 21 and 22. To form this seal assembly two sleeves 28, 29, with internal flanges 30 and 31 are welded at 32 to the top edge of the outer tube 22, the two flanges 30 and 31 clamping the remaining part of the seal assembly together. Thus an alpha-alumina flange 33 on the tube 21 abuts against the lower flange 30 through an aluminium gasket 34, and insulating flange 35 on the tube 23 abuts against the flange 33 through a gasket 36 of aluminium or graphite and the flange 31 presses against the flange 35. The flange 35 is sealed to the tube 23 by a glass seal 37.

To prevent the low resistance metal layer 5 in the FIG. 1 embodiment and the layer 25 in the FIG. 2 embodiment from being corroded by the molten sulphur and alkali metal polysulphides permeating through the carbon or graphite layer, an electronically conducting barrier layer can be provided between the carbon or graphite and the metal layer 5 or 25. As described above, this may take the form of a metal sulphide or a metal carbide.

We claim:

1. A galvanic cell in which the electrochemical reactants are alkali-metal as the anode active material and sulphur material as the cathode active material, an anode compartment, a cathode compartment, said anode and cathode compartments being separated by a solid electrolyte which is an alkali metal ion conductor, current collecting poles associated with the anode and cathode compartments, the current collecting pole associated with the cathode compartment comprising a first layer of an electronically conducting material which is resistant to the corrosive action of sulphur and alkali metal polysulphides and which defines a continuous surface in contact with the sulphur and alkali metal polysulphides and a second layer of a higher electronically conducting material in electrical contact with said first layer over the surface of the latter remote from the sulphur and alkali metal polysulphides.

2. A galvanic cell according to claim 1 wherein said second layer comprises a low resistance metal.

3. A galvanic cell according to claim 2 wherein said second layer of low resistance metal is provided on said first layer of plating.

4. A galvanic cell according to claim 1 wherein said first layer is a material selected from the group consisting of carbon or graphite.

5. A galvanic cell according to claim 4 wherein it is arranged that the pores of the carbon or graphite in the region of the interface of said first and second layers become filled during the cell reaction by a metal sulphide which inhibits the sulphur and alkali metal polysulphides reacting and corroding said second layer to an extent that it is no longer effective.

6. A galvanic cell according to claim 5 wherein said second layer is of low resistance metal and is initially sufficiently thick to permit the formation of said metal sulphide by the chemical reaction between said low resistance metal and the sulphur and alkali metal polysulphides during the cell reaction.

7. A galvanic cell according to claim 5 wherein a metal barrier layer is initially provided between said first and second layers, the barrier layer being corrodible by the sulphur to form said metal sulphide.

8. A galvanic cell according to claim 7 wherein said second layer of low resistance metal is provided on said barrier layer by plating.

9. A galvanic cell according to claim 4 wherein a metal carbide barrier layer is provided between said first and second layers.

10. A galvanic cell according to claim 9 wherein said carbide is formed in situ by reaction between said carbon or graphite with a metal layer formed on said carbon or graphite.

11. An alkali metal sulphur cell comprising an outer tubular member, an inner tubular member forming the solid electrolyte of the cell and dividing the interior of the outer tubular member into an anode compartment constituted by the annular space between the inner and outer tubular members and a cathode compartment constituted by the interior of the inner tubular member, and in which respective current collecting poles are associated with the anode and cathode compartments, characterized in that the current collecting pole associated with the cathode compartment comprises a carbon or graphite tube extending axially within the inner tubular member, said carbon or graphite tube extending axially within the inner tubular member, said carbon or graphite tube having adhering to its inner surface a layer of material of higher electronic conductivity than carbon or graphite.

12. A galvanic cell according to claim 11 wherein said layer comprises a low resistance metal.

13. A galvanic cell according to claim 12 wherein said layer of low resistance metal is provided by plating.

14. A galvanic cell according to claim 11 wherein the pores of the carbon or graphite in the region of the interface of said adhering layer are filled or become filled during the cell reaction by a metal sulphide which inhibits the sulphur and alkali metal polysulphides reacting and corroding said layer to an extent that it is no longer effective.

15. A galvanic cell according to claim 14 wherein said layer is of low resistance metal and is initially sufficiently thick to permit the formation of said metal sulphide by the chemical reaction between said low resistance metal and the sulphur and/or alkali metal polysulphides during the cell reaction.

16. A galvanic cell according to claim 14 wherein a metal barrier layer is initally provided between said carbon or graphite tube and said first mentioned layer, the barrier layer being corrodible by the sulphur to form said metal sulphide.

17. A galvanic cell according to claim 16 wherein said first mentioned layer is of low resistance metal and is provided on said barrier layer by plating.

18. A galvanic cell according to claim 11 wherein the carbon or graphite tube is impregnated with a salt or mixture of salts whose melting point is above the normal cell operating temperature.

19. A galvanic cell according to claim 18 wherein said salt or salts are selected from Group IA (alkali) and/or Group IIA (alkaline earth) metals.

20. A galvanic cell according to claim 19 wherein said mixture of salts comprises the chlorides of lithium and sodium.

21. A galvanic cell according to claim 18 wherein an activator is included with said salt or salts which activator promotes wetting of the carbon or graphite by the salt or salts.

22. A galvanic cell according to claim 21 wherein said activator is one which reacts with carbon or graphite.

23. A galvanic cell according to claim 11 wherein a metal carbide layer is provided between said carbon or graphite tube and said first mentioned layer.

24. A galvanic cell according to claim 23 wherein said carbide is formed in situ by reaction between a metal layer and said carbon or graphite.

* * * * *